United States Patent [19]

Zwick

[11] Patent Number: 4,484,759
[45] Date of Patent: Nov. 27, 1984

[54] HITCH ASSEMBLY FOR A SINGLE WHEEL TRAILER

[75] Inventor: David J. Zwick, Stoystown, Pa.

[73] Assignee: The Coleman Company, Inc., Wichita, Kans.

[21] Appl. No.: 428,385

[22] Filed: Sep. 29, 1982

[51] Int. Cl.³ .............................................. B60D 1/00
[52] U.S. Cl. .................................. 280/460 R; 280/78; 280/415 A; 280/462; 280/500
[58] Field of Search .................. 280/78, 415 R, 415 A, 280/460 R, 462, 500, 502; 224/273, 42.03 R, 42.07

[56] References Cited

U.S. PATENT DOCUMENTS

| | | | |
|---|---|---|---|
| 2,057,655 | 10/1936 | Anthony et al. | 280/460 R |
| 2,614,860 | 10/1952 | Samdahl | 280/460 R |
| 3,186,734 | 6/1965 | Toumey | 280/460 R |
| 3,512,804 | 5/1970 | Siegert | 280/460 R |
| 3,560,024 | 5/1969 | Abromavage | 280/502 |
| 4,078,821 | 3/1978 | Kitterman | 280/460 R |

FOREIGN PATENT DOCUMENTS 1140551 1/1969 United Kingdom .

Primary Examiner—Joseph F. Peters, Jr.
Assistant Examiner—Kenneth R. Rice

[57] ABSTRACT

A hitch assembly for a single wheel trailer includes an elongated hitch bar which is adapted to be mounted on a trailer hitch of a vehicle for towing the trailer. The hitch bar extends parallel to the rear bumper of the vehicle, and a pair of angles are adjustably mounted on the bar for vertical movement for engaging the bottom of the bumper. A pair of bumper pads are adjustably mounted on the bar for fore-and-aft movement for engaging the rear end of the bumper. A pair of latch assemblies on the bar releasably connect a pair of attaching tongues on the trailer to the bar. Each latch assembly includes a hook for engaging a pin on one of the tongues, and the vertical position of the pin is adjustable.

16 Claims, 24 Drawing Figures

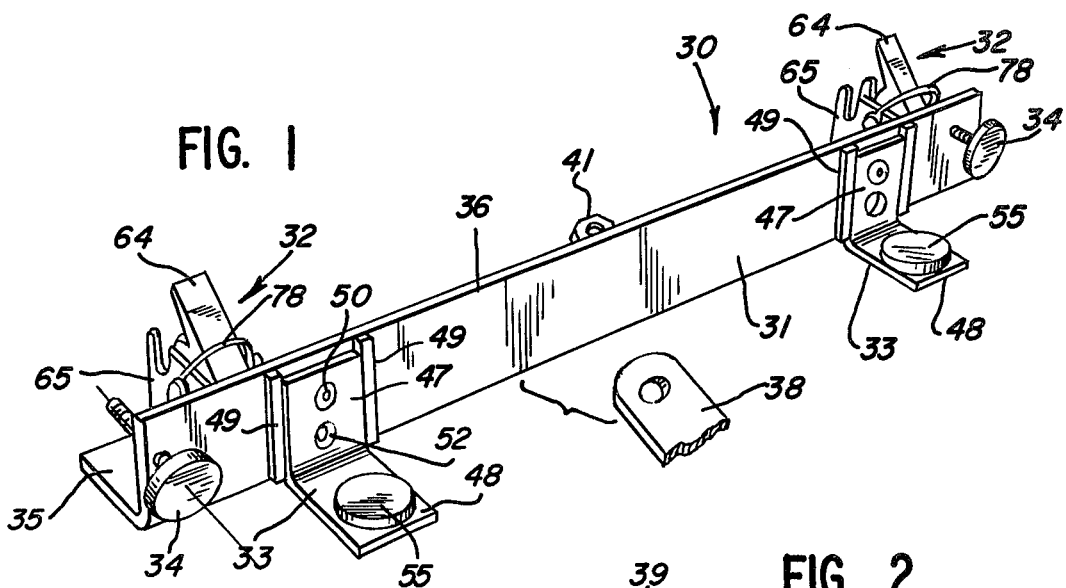
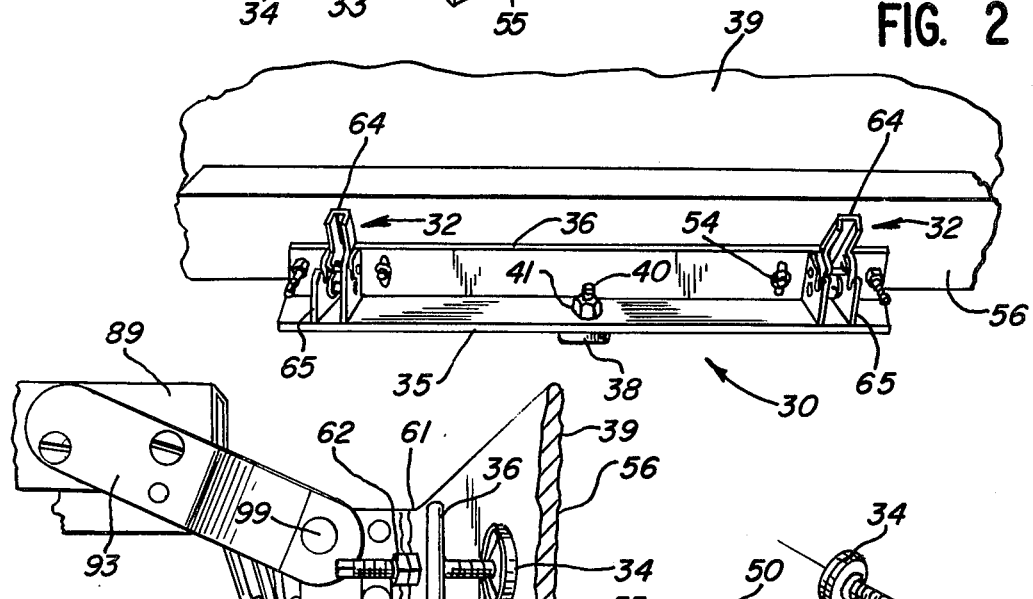
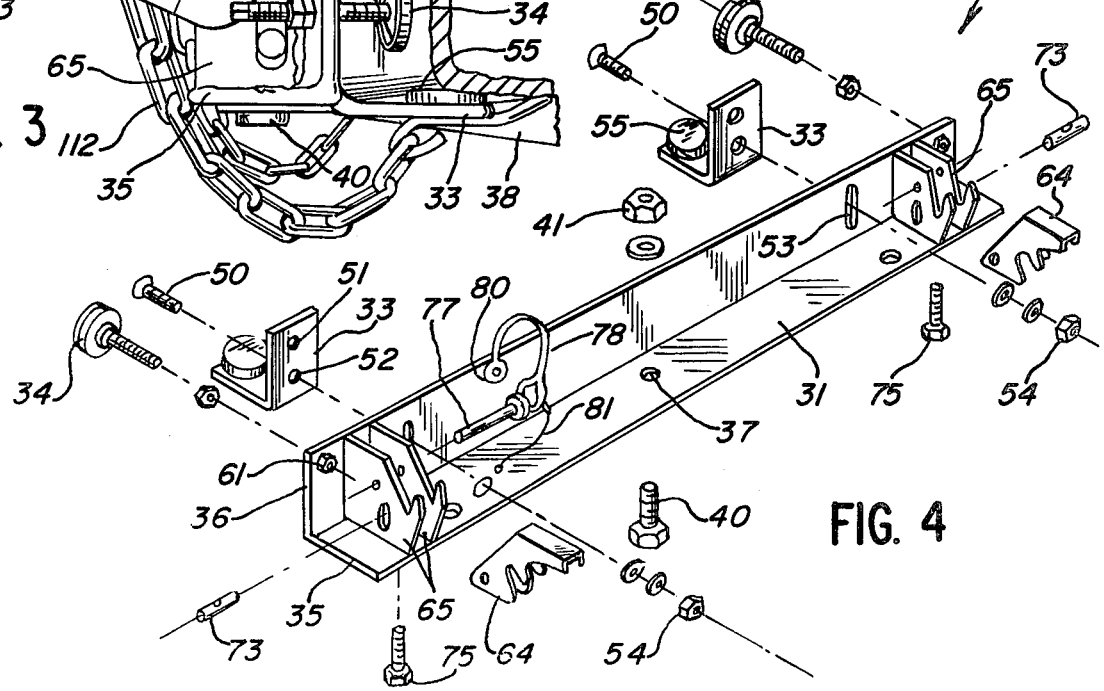

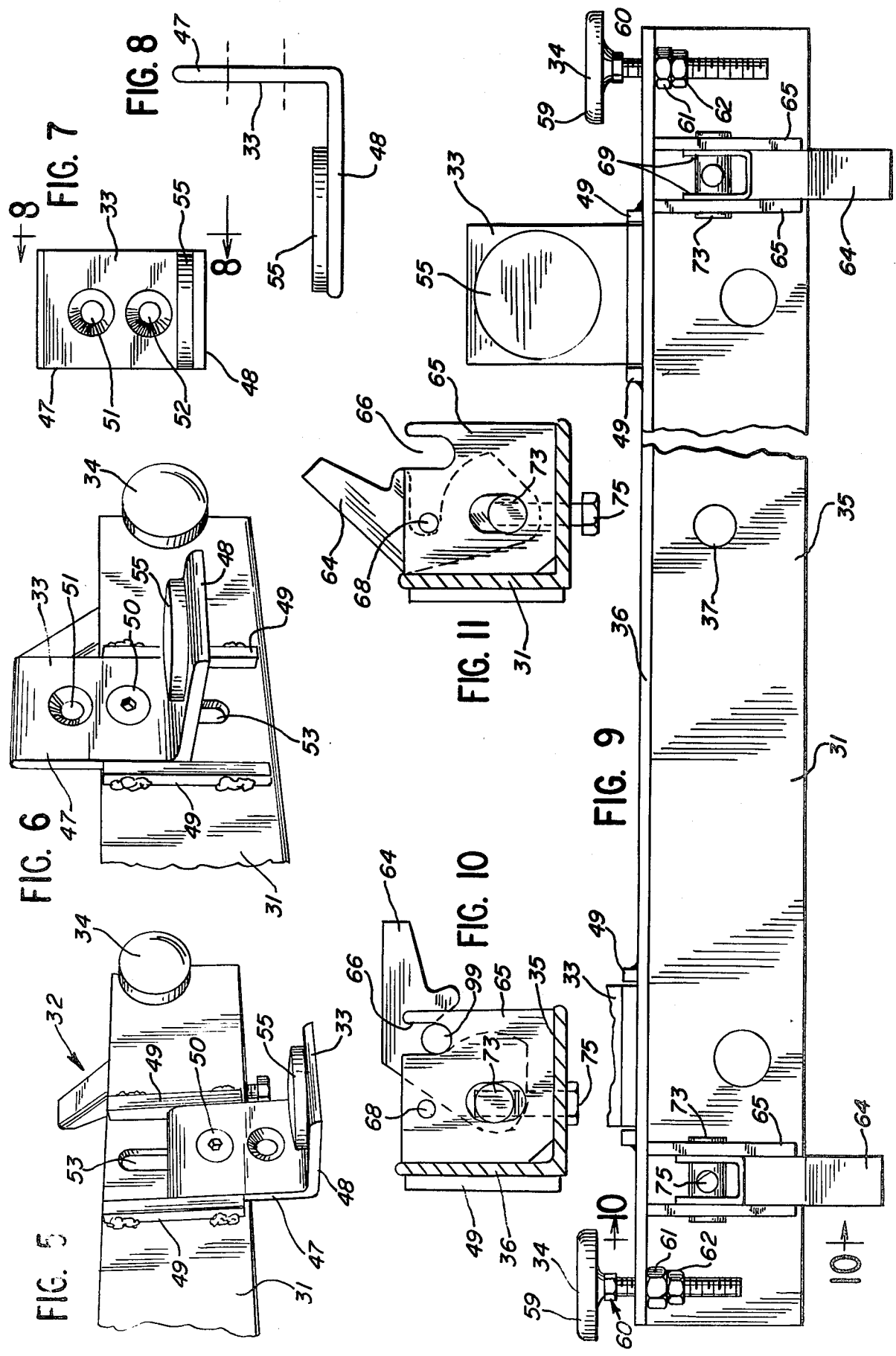

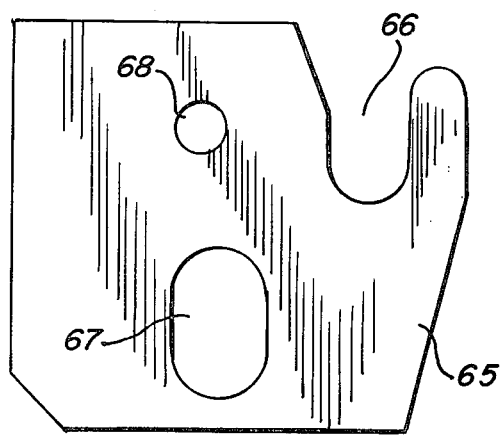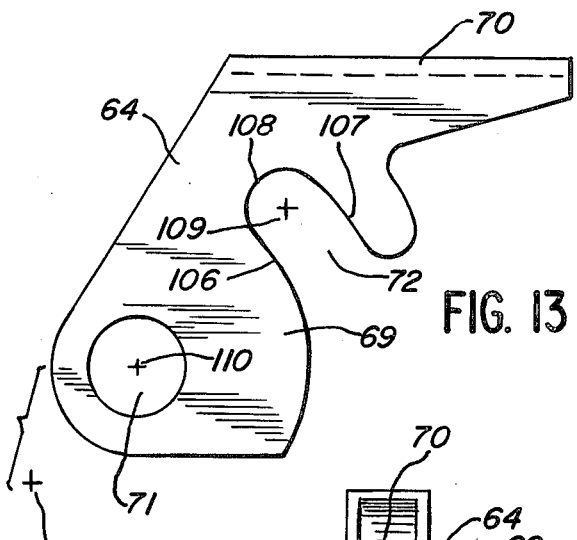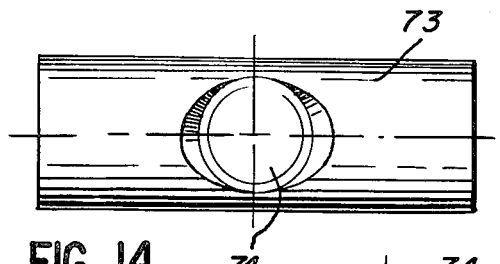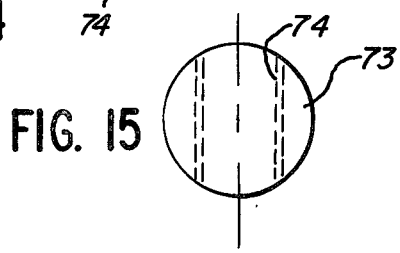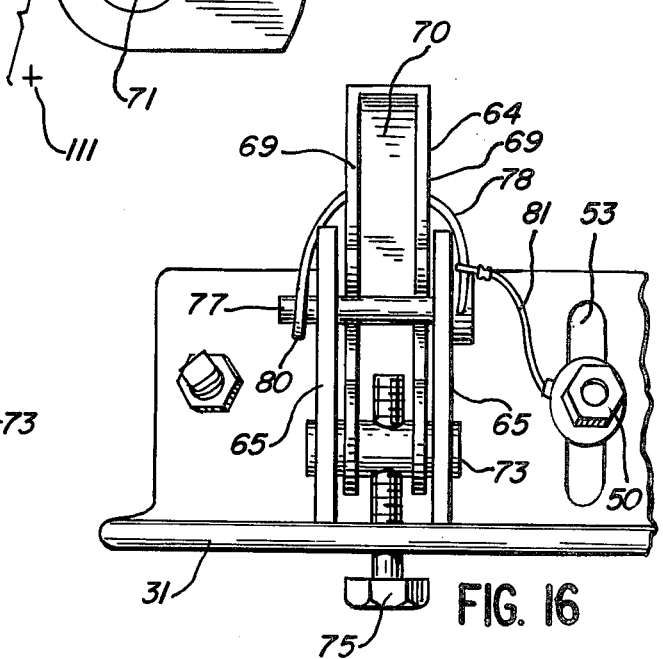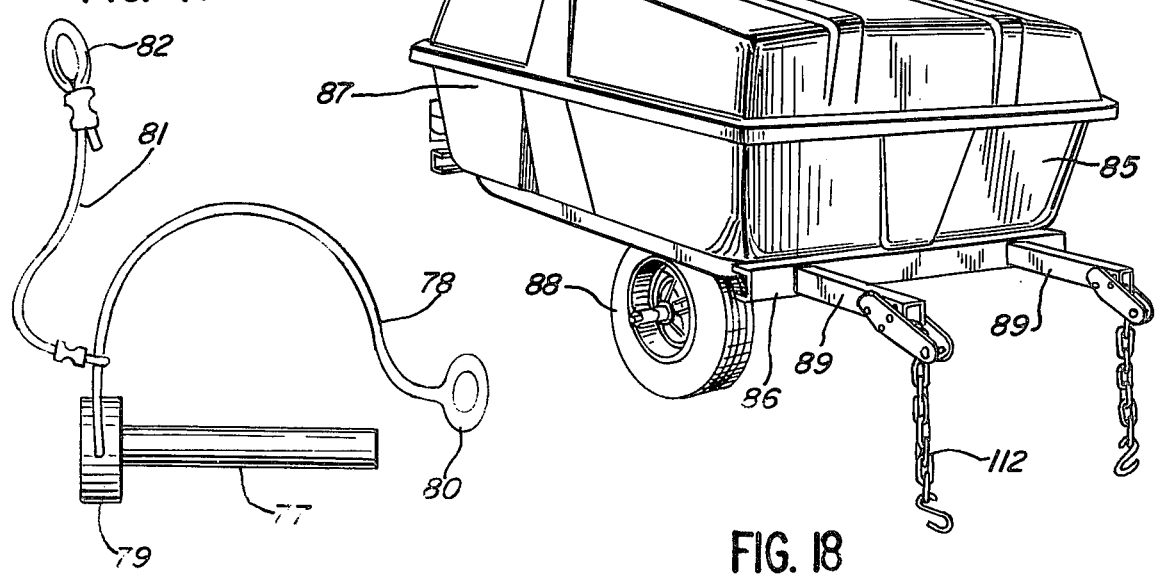

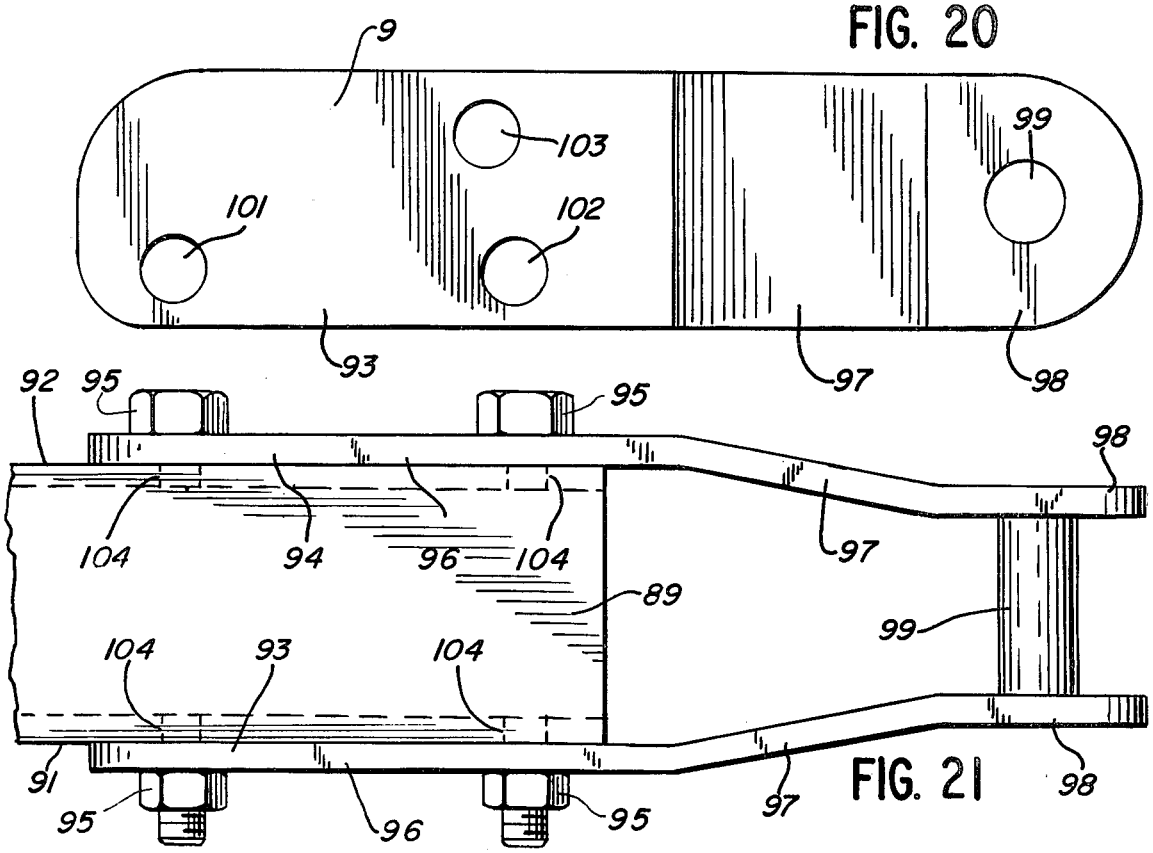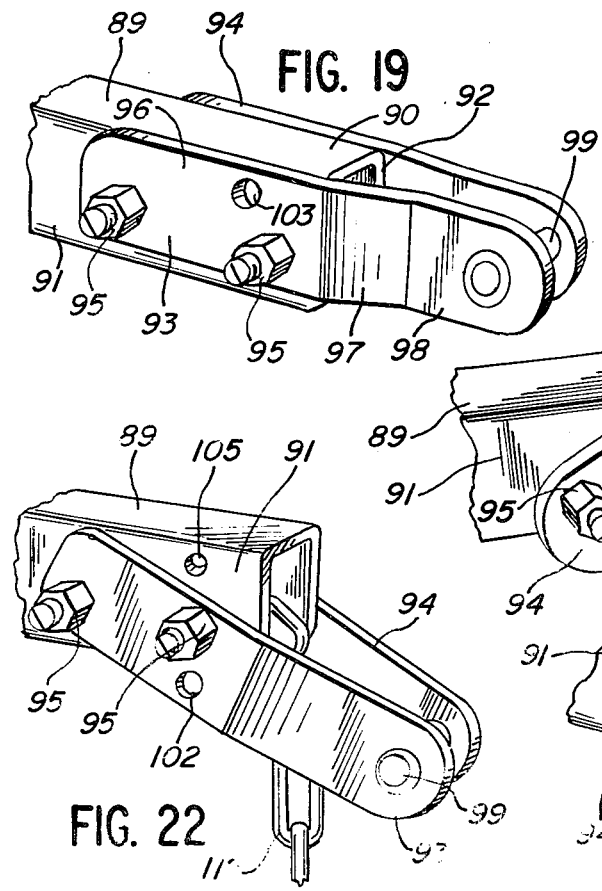

HITCH ASSEMBLY FOR A SINGLE WHEEL TRAILER

BACKGROUND AND SUMMARY

This invention relates to a trailer hitch assembly, and more particularly, to a hitch assembly for use with a single wheel trailer. Single wheel trailers include a single wheel which is mounted on a swivel so that the trailer can turn. Such trailers are preferably connected to the towing vehicle in a relatively rigid fashion so that the trailer can be backed up without difficulty. The connection is conventionally accomplished by a pair of spaced-apart attaching tongues which extend from the trailer. If a conventional single tongue attachment were used, the tongue would rotate on the trailer hitch when the trailer was backed up and the movement of the trailer could not be controlled. However, the double tongues of the trailer cannot ordinarily be attached to a conventional trailer hitch which is designed for a multiple wheel trailer. The double tongues require a more complicated hitch or require an attachment to the bumper. Such an attachment may even require drilling holes in the bumper of the towing vehicle.

The invention provides a hitch assembly which can be connected to a conventional trailer hitch which is designed for multiple wheel trailers. An elongated bar is bolted to the trailer hitch so that the bar extends parallel to the rear bumper of the towing vehicle. A pair of L-shaped angles are adjustably mounted on the bars so that the lower portion of the angles extend underneath the bumper, and a pair of bumper pads are adjustably mounted on the bar and engage the bumper to prevent the bar from rotating with respect to the bumper. Since the bar is not attached to the bumper, the bar does not affect the energy-absorbing or collapsing feature of current bumpers. A pair of latching assemblies are mounted on the bar for attaching the bar to a pair of tongues on the trailer. Each latch assembly includes a pivotally mounted hook, and the vertical position of the hook is adjustable to vary the position and locking force of the hook. Each hook is engagable with a pin on one of the tongues, and the pin is carried by a pair of tongue extension plates which are mounted on the tongue to provide multiple positions for the pin in order to accomodate different bumper heights.

DESCRIPTION OF THE DRAWING

The invention will be explained in conjunction with an illustrative embodiment shown in the accompanying drawing in which FIG. 1 is a perspective view of the hitch assembly showing a portion of a trailer hitch which is mounted on the towing vehicle;

FIG. 2 is a fragmentary perspective view of the rear portion of a towing vehicle showing the hitch assembly attached to the trailer hitch;

FIG. 3 is a fragmentary perspective view showing the trailer hitch assembly attached to the vehicle and one of the tongues of the trailer attached to the hitch assembly;

FIG. 4 is a fragmentary exploded view of the hitch assembly;

FIG. 5 is a fragmentary perspective view of the hitch assembly showing one of the angles in a lowered position;

FIG. 6 is a view similar to FIG. 5 showing the angle in a raised position;

FIG. 7 is an elevational view of the angle of FIGS. 5 and 6;

FIG. 8 is a side elevational view of FIG. 7;

FIG. 9 is a top plan view partially broken away of the hitch assembly;

FIG. 10 is a sectional view taken along the lines 10—10 of FIG. 9 with the angles removed.;

FIG. 11 is a view similar to FIG. 10 showing the latching hook in its unlatched position;

FIG. 12 is a side elevational view of one of the latch plates;

FIG. 13 is a side elevational view of the latching hook;

FIG. 14 is a top plan view of the mounting pin for the latch hook;

FIG. 15 is an end elevational view of the mounting pin;

FIG. 16 is a fragmentary elevational view of one end of the hitch assembly showing one of the latch hooks locked in its open position;

FIG. 17 is an elevational view of the lock pin assembly;

FIG. 18 is a perspective view of a single wheel trailer with a pair of attaching tongues;

FIG. 19 is a fragmentary perspective view of the end of one of the attaching tongues of the trailer showing the tongue extension plates;

FIG. 20 is an enlarged side elevational view of the tongue extension plates;

FIG. 21 is a fragmentary top plan view of the end of one of the attaching tongues and its tongue extension plate;

FIG. 22 is a fragmentary extention view showing the tongue extension plates in one of the alternate positions;

FIG. 23 is a fragmentary perspective view showing the tongue extension plates in another alternate position and attached to the hitch assembly; and FIG. 24 is a fragmentary perspective view showing the tongue extension plates in another alternate position.

DESCRIPTION OF SPECIFIC EMBODIMENT

Referring to FIGS. 1–4, a hitch assembly 30 includes an elongated angle bar 31, a pair of latching assemblies 32, a pair of L-shaped angles 33, and a pair of bumper pads 34. The L-shaped bar 31 includes a horizontally extending bottom portion 35, and a vertically extending portion 36. A bolt hole 37 is provided in the bottom portion 35, and the bar can be attached to a conventional trailer hitch 38 on a vehicle 39 by a bolt 40 and a nut 41.

The angles 33 include a vertical portion 47 (FIG. #1) and a horizontal portion 48. The vertical portion of the angle is slidable between a pair of vertical rails 49 which are welded to bar 31. The angle is adjustably attached to the hitch bar 31 by a bolt 50, which is inserted through one of two openings 51 and 52 in the angle and through a vertically elongated slot 53 in the bar 31 (see also FIGS. 5–7). A nut 54 secures the bolt. A resilient pad or cushion 55 of rubber or similar material is attached to the horizontal portion 48 of each angle 33, and the vertical positions of the angles are adjusted until each pad engages the bottom of the bumper 56 (see FIG. 3) of the vehicle. The extreme lower and upper positions of the angles are illustrated in FIGS. 5 and 6.

Referring to FIG. 9, each of the bumper pads 34 includes a resilient pad 59 of rubber or similar material which is mounted on a bolt 60. A nut 61 is welded to each end of the hitch bar 31 in alignment with a bolt hole, and each bolt 60 is screwed into one of the nuts 61. A backup nut 62 is screwed onto each bolt against the nut 61 to secure the bolt in the desired position.

After the hitch bar 31 is attached to the trailer hitch 38, the bumper pads are unscrewed until they contact the rear surface of the bumper 56 as shown in FIG. 3. The nuts 62 are then tightened against the nuts 61 to prevent the bumper pads from vibrating loose. The end of the bolt 60 is provided with six flat faces to facilitate gripping by a wrench or pliers.

The bumper pads 34 prevent the hitch bar from swiveling or rotating in a horizontal plane and the angles 33 prevent the bar from tilting or rotating in a vertical plane. The bar is thereby maintained parallel to the bumper even though the bar is attached to the vehicle only at the bumper 38.

Current automobile bumpers have the ability to be compressed when the vehicle is struck to absorb energy and to reduce the risk of damage and injury. After impact, the bumper returns to its original position. Since the bumper pads 34 and the angles 33 are not attached to the bumper, they do not interfere with the energy-absorbing feature of the bumper. Referring to FIG. 3, if the bumper 56 is compressed, it is free to move to the right away from the bumper pads 54 and 55. After impact, the bumper returns to its original position adjacent to the pads.

Referring now to FIGS. 1 and 4, each of the latching assemblies 32 includes a hook 64 which is pivotally mounted between a pair of parallel latch plates 65. Each of the latch plates is inserted into the angle of the hitch bar 31 and welded to the bar. As can be seen best in FIG. 12, each latch plate is provided with a upwardly opening latching slot 66, a vertically elongated slot 67, and an opening 68.

Each latching hook is generally channel shaped in cross section (FIG. 16) and includes a pair of parallel side walls 69 and a bight portion 70. A mounting opening 71 (FIG. 13) and a downwardly opening latching slot 72 are provided in the side walls.

Each of the latching hooks 64 is pivotally mounted between a pair of latching plates 65 by a pin 73 (FIGS. 9 and 16) which extends through the mounting openings 71 in the hook and the slots 67 in the latching plates. Referring to FIGS. 14 and 15, the pin is provided with a threaded opening 74, and an adjusting bolt 75 extends through an opening in the hitch bar and is screwed into the opening 74. The vertical position of the mounting pin 73 within the slot 67 can be adjusted by turning the adjusting bolt 75.

As will be explained more fully hereinafter, the latching hooks releasably latch the trailer to the hitch assembly. The latching hooks are pivotable between an open or unlatched position shown in FIGS. 1, 2, 11, and 16 and a closed or latched position shown in FIGS. 9 and 10. Each of the hooks can be locked in the unlatched position by a locking pin 77 (FIGS. 4, 16, and 17) which can be inserted through the openings 68 in the latch plates and into the latching slot 72 of the hook (see FIGS. 11 and 16) to prevent the hook from pivoting downwardly. The hooks can be locked in the latched position by inserting the lock pins 77 through the openings 68 to prevent the hooks from pivoting upwardly (see FIG. 10).

Referring to FIG. 17, a flexible retainer strap 78 is attached to the head 79 of each locking pin, and the strap includes a looped end 80 (see also FIG. 4) which can be inserted over the locking pin to retain the locking pin in the latch plates 65. A lanyard 81 is attached to the strap 78, and the looped end 82 of the lanyard is secured by the bolt 50 (FIG. 16) which secures one of the angles 33.

Referring to FIG. 18, a single wheel trailer 85 includes a metal frame or chassis 86 which supports a container body 87 and a wheel 88 which is attached to the frame by a swivel joint. A pair of elongated tongues 89 extend from the frame for attaching the trailer to the towing vehicle.

As can be seen in FIGS. 19-24, each of the attaching tongues 89 is formed by a rectangular metal tube 90 which includes a pair of side walls 91 and 92. A pair of tongue extension plates 93 and 94 are attached to the ends of the side walls of the tongue by bolts and nuts 95. Each tongue extension plate includes a flat parallel attaching portion 96, a laterally inwardly extending intermediate portion 97, and a flat parallel end portion 98. A pin 99 extends between the end portion 98 and is attached thereto.

Each of the tongue extension plates is provided with three bolt openings 101, 102 and 103 (FIG. 20). The openings 101 and 102 are aligned parallel to the longitudinal axis of the tongue extension plate but are offset below the longitudinal axis. The opening 103 lies along an arc which extends through the opening 102 and has a radius equal to the distance between the openings 101 and 102. The distance between the openings 101 and 102 is the same as the distance between the openings 101 and 103.

The attaching tongues 89 are provided with a pair of bolt holes 104 (FIG. 21) in each of the side walls 91 and 92 for receiving the bolts and nuts 95. The bolt holes in the tongue are aligned parallel to the longitudinal axis of the tongue. When the holes 101 and 102 of the tongue extension plates 93 and 94 are aligned with the bolt holes in the side walls 91 and 92, respectively, of the tongues as shown in FIG. 19, the tongue extention plates extend parallel to the tongue.

The tongue extension plates can extend downwardly from the tongue as shown in FIG. 22 by aligning the openings 103 in the tongue extension plates with the forward opening in the tongue.

Referring to FIG. 23, the tongue extension plates can extend upwardly from the tongue by turning the tongue extension plates upside down so that the extension plate 93 abuts the side wall 92 of the tongue and the extension plate 94 abuts the side wall 91 of the tongue. When the openings 101 and 103 are aligned with the bolt openings of the tongue, the tongue extension plates extend upwardly as shown in FIG. 23.

In FIG. 24, the tongue extension plates are rotated downwardly from their FIG. 23 position so that the openings 101 and 102 arealigned with the bolt openings in the tongue. The tongue extension plates extend parallel to the longitudinal axis of the tongue but at a slightly lower position than in FIG. 10 because the openings 101 and 102 are offset from the center line of the tongue extension plates.

The tongue extension plates can thereby be adjusted to provide four different height positions for the pins 99. This enables the trailer to be attached to vehicles having different bumper heights while maintaining the attaching tongues generally horizontal. It is desirable that the tongues be horizontal to prevent the trailer from raising or lowering when the direction of the vehicle is reversed, for example, when backing up. Further variability for the positions of the tongue extension plates can be created by providing a third bolt opening 105 (FIG. 22 and 24) in each side wall of the tongue. This would permit the tongue extension plates to be rotated upwardly from their FIG. 19 position until the openings 102 were aligned with the openings 105.

The trailer is attached to the hitch assembly by inserting the two pins 99 on the two sets of tongue extension plates into the slot 66 (FIG. 11) of the latch plates. The hooks 64 are in their raised or open position. The hooks are then pivoted downwardly so that the pins 99 are positioned within the slot 72 (FIG. 13) of the hooks. The pins 99 are thereby locked within the latch assembly, and the hooks can be retained in the locked position by the lock pins 77.

The slot 72 in each hook is designed to provide a tightening force on the pins 99 as the hooks are rotated downwardly. Referring to FIG. 13, the slot is provided by an inner curved wall 106, and outer curved wall 107, and a curved end wall 108. The curved end wall 108 has approximately the radius as the pin 99 and has a center 109. The inner wall 106 curves about the center 110 of the pivot opening 71, and the outer wall curves about a center 111 which is substantially beyond the center 110. The centers 109, 110, and 111 lie on a common line.

The outer wall 107 has a substantially greater radius of curvature than the inner wall 106, and the walls therefore diverge as they curve away from the center 109. The mouth of the slot 72 is therefore wider than the portion of the slot at the center 109. In one specific embodiment, the inner wall 108 had a radius of 9/32 inch. The inner wall 106 had a radius of 1⅛ inch (the distance between the inner wall and the center 110). The outer wall had a radius of 2 11/16 inch (the distance between the outer wall and the center 111). The distance between the centers 110 and 111 was 1 inch.

When the mouth of the slot 72 engages the pin 99 on the tongue extension plates, the width of the slot is substantially greater than the diameter of the pin, and the pin does not have to be centered at the bottom of the slot 66 in the latch plate 65 in order for the hook to engage the pin. As the hook is rotated downwardly with respect to pin 99, the width of the slot decreases and the curved outer wall of the slot pushes the pin toward the center 109.

The fit of the hook can be adjusted by turning the adjusting bolt 75 (FIGS. 10, 11, and 16) which is screwed into the pivot pin 73 of the hook. The adjusting bolt is slidable within an opening in the hitch bar and adjusts the maximum height of the pivot pin 73. The adjusting bolt is used to compensate for manufacturing tolerances and wear of the latching parts. In the preferred embodiment, a patch of Eslock was applied to one side of bolt 75 to provide an anti-vibrational fit between the threads of the bolt and the threads of the pivot pin 73 to prevent the bolt from vibrating loose.

The trailer is connected to the hitch assembly by a horizontal pin which is inserted into vertically extending slots in the hitch assembly, and the pins are retained in the slots by hooks which have eccentric slots which first engage the pins and then tightened on the pins as the hooks are rotated. The fore-and-aft position of the pin is maintained by the vertical slot in the latch plates, and the connection between the trailer and the hitch assembly is not subject to binding which sometimes occurs with the conventional ball and socket connections.

A chain 112 (FIGS. 3, 18, and 22) is attached to each of the tongues of the trailer and can be attached to the hitch angle 31 (FIGS. 1, 4) to provide a safety connection between the trailer and the vehicle.

While in the foregoing specification a detailed description of a specific embodiment of the invention was set forth for the purpose of illustration, it will be understood that many of the details herein given may be varied considerably by those skilled in the art without departing from the spirit and scope of the invention.

I claim:

1. A hitch assembly for releasably connecting a vehicle to a trailer which is to be towed by the vehicle, the vehicle having a rear bumper and a trailer hitch extending rearwardly beyond the rear bumper, the hitch assembly comprising an elongated bar adapted to be attached to the trailer hitch so that the bar extends generally parallel to and spaced from the rear bumper, a pair of L-shaped angles adjustably mounted on the bar at spaced-apart positions, each angle having a first portion attached to the bar and a second portion adapted to extend beneath the rear bumper, means for adjustably mounting the first portion of each angle on the bar so that the position of the second portion of the angle relative to the rear bumper can be adjusted, a pair of bumper pads adjustably mounted on the bar at spaced-apart positions and adapted to engage the rear of the rear bumper, and means for adjustably mounting the bumper pads on the bar so that the bumper pads can be moved toward and away from the rear bumper.

2. The hitch assembly of claim 1 including a cushion pad mounted on the second portion of each of said angles and adapted to engage the bottom of the rear bumper.

3. The hitch assembly of claim 1 in which the means for adjustably mounting the first portion of each angle on the bar includes a bolt which is threadedly engaged with the angle and which extends through an elongated slot in the bar.

4. The hitch assembly of claim 1 in which the means for adjustably mounting each of the bumper pads on the bar includes a bolt attached to each pad which is threadedly engaged with an opening in the bar.

5. The hitch assembly of claim 1 in which the bar is L-shaped in traverse cross-section and has first and second portions, said angles and said bumper pads being mounted on said first portion of the bar and extending away from said second portion of the bar.

6. The hitch assembly of claim 5 including a pair of latching assemblies mounted on the second portion of the L-shaped bar, each latching assembly including a pair of parallel plates and a hook pivotally mounted between the plates, each of the plates having a slot for receiving a pin which can be locked in the slots by the hook whereby the trailer can be releasably latched to the hitch assembly by inserting a pair of pins attached to the trailer into the slots and pivoting the hooks into engagement with the pins.

7. A hitch assembly for releasably connecting a vehicle to a trailer which is to be towed by the vehicle, the trailer having a pair of attaching tongues extending therefrom, the hitch assembly comprising an elongated bar adapted to be attached to the vehicle in a direction which extends generally perpendicularly to the direction in which the vehicle travels, a pair of latching assemblies fixedly mounted directly on the bar, each latching assembly including a pair of parallel plates and a hook pivotally mounted between the plates, each of the attaching tongues of the trailer, the hooks being pivotable into engagement with the pins to lock the pins in the slots.

8. The hitch assembly of claim 7 in which each of the latch assemblies includes a mounting pin extending between the plate of the latching assemblies, the hook being pivotally mounted on the mounting pin.

9. The hitch assembly of claim 8 in which each of the latch assemblies includes means for adjustably mounting the mounting pin between the mounting plates of the latching assembly.

10. The hitch assembly of claim 9 in which the means for adjustably mounting the mounting pins includes a bolt rotatably mounted on the bar and threadedly engaged with the mounting pin, the ends of the mounting pin extending through elongated slots in the plates of the latching assembly whereby the position of the mounting pin within the slots can be adjusted by rotating the bolt.

11. The hitch assembly of claim 7 in which the hook of each latching assembly is provided with a curved slot for receiving the pin on one of the attaching tongues, the curved slot having an open mouth and a closed locking end, the curved slot being defined by a curved inner wall having a radius about the pivot axis of the hook and a curved outer wall having a radius about a point beyond said pivot axis whereby the slot narrows from the mouth toward the locking end.

12. The hitch assembly of claim 11 in which the center of the curved outer wall of the slot is aligned with the center of the curved inner wall and the center of the pin when the pin is at the locking end of the slot.

13. The hitch assembly of claim 12 in which each of the latching assemblies includes a mounting pin extending between the plates of the latching assembly and into elongated slots in the plates, the hook being pivotally mounted on the mounting pin, and a bolt rotatably mounted on the bar and threadedly engaged with the mounting pin whereby the position of the mounting pin within the slots can be adjusted by rotating the bolt.

14. The hitch assembly of claim 7 in which the bar includes front and rear sides, the latching assemblies being mounted on the rear side of the bar, a pair of L-shaped angles mounted on the front side of the bar, each angle having a first portion attached to the bar and a second portion adapted to extend beneath the rear bumper of the vehicle, means for adjustably mounting the first portion of each angle on the bar so that the second portion of the angle relative to the rear bumper can be adjusted, a pair of bumper pads adjustably mounted on the bar at spaced-apart positions and adapted to engage the rear of the rear bumper, and means for adjustably mounting the bumper pads on the bar so that the bumper pads can be moved toward and away from the rear bumper.

15. The hitch assembly of claim 7 in combination with a trailer having a pair of generally horizontally extended elongated attaching tongues, each tongue including a tongue extension plate mounted on the tongue and a pin mounted on the tongues extension plate and extending generally perpendicularly to the tongue, each tongue having a pair of longitudinally spaced bolt holes, each tongue extension plate having first, second and third bolt holes, the tongue extension plate being movable with respect to the tongue between:
  a first upright position in which the first and second bolt holes are aligned with the pair of bolt holes in the tongue and the tongue extension plate extends generally parallel to the tongue;
  a second upright position in which the first and third bolt holes are aligned with the pair of bolt holes in the tongue and the tongue extension plate extends angularly downwardly from the tongue;
  a first inverted position in which the first and second bolt holes are aligned with the pair of bolt holes in the tongue and the tongue extension plate extends generally parallel to the tongue at a different height than said first upright position; and
  a second inverted position in which the first and third bolt holes are aligned with the pair of bolt holes in the tongue and the tongue extension plate extends angularly upward from the tongue.

16. The hitch assembly of claim 15 in which each tongue includes a pair of spaced-apart tongue extension plates, each pin extending between a pair of spaced-apart tongue extension plates.

* * * * *